United States Patent
Mueller et al.

(10) Patent No.: US 10,322,670 B2
(45) Date of Patent: Jun. 18, 2019

(54) INTERIOR LIGHTING OF A MOTOR VEHICLE

(71) Applicant: Bayerische Motoren Werke Aktiengesellschaft, Munich (DE)

(72) Inventors: Michael Mueller, Munich (DE); Christian Bauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/946,315

(22) Filed: Apr. 5, 2018

(65) Prior Publication Data

US 2018/0222383 A1    Aug. 9, 2018

Related U.S. Application Data

(63) Continuation of application No. PCT/EP2016/074705, filed on Oct. 14, 2016.

(30) Foreign Application Priority Data

Oct. 29, 2015 (DE) .................. 10 2015 221 180

(51) Int. Cl.
| | | |
|---|---|---|
| *B60Q 3/80* | (2017.01) | |
| *H05B 37/02* | (2006.01) | |
| *B60Q 3/74* | (2017.01) | |
| *B60Q 3/62* | (2017.01) | |
| *H05B 33/08* | (2006.01) | |

(52) U.S. Cl.
CPC ............ *B60Q 3/80* (2017.02); *B60Q 3/62* (2017.02); *B60Q 3/74* (2017.02); *H05B 33/086* (2013.01); *H05B 37/0254* (2013.01)

(58) Field of Classification Search
None
See application file for complete search history.

(56) References Cited

U.S. PATENT DOCUMENTS

| | | | |
|---|---|---|---|
| 2003/0152088 A1* | 8/2003 | Kominami | B60N 2/0248 370/401 |
| 2008/0080197 A1 | 4/2008 | Heine et al. | |
| 2011/0305031 A1 | 12/2011 | Riedel et al. | |
| 2014/0197757 A1 | 7/2014 | Heinrich | |
| 2015/0198319 A1* | 7/2015 | Salter | F21V 25/10 362/293 |

FOREIGN PATENT DOCUMENTS

| | | |
|---|---|---|
| DE | 100 37 131 A1 | 2/2002 |
| DE | 20 2006 014 933 U1 | 3/2008 |

(Continued)

OTHER PUBLICATIONS

International Search Report (PCT/ISA/210) issued in PCT Application No. PCT/EP2016/074705 dated Jan. 17, 2017 with English translation (seven pages).

(Continued)

*Primary Examiner* — Jany Richardson
(74) *Attorney, Agent, or Firm* — Crowell & Moring LLP

(57) ABSTRACT

A motor vehicle has a central light control device, a plurality of peripheral light control devices distributed within the vehicle, and a plurality of interior light modules, each of which has a plurality of light sources and is associated with a peripheral light control device.

10 Claims, 1 Drawing Sheet

(56) References Cited

FOREIGN PATENT DOCUMENTS

| DE | 10 2009 010 553 A1 | 9/2010 |
| DE | 10 2012 017 656 A1 | 3/2014 |
| DE | 10 2013 200 512 A1 | 7/2014 |
| DE | 10 2013 015 343 A1 | 3/2015 |
| DE | 10 2013 219 597 A1 | 4/2015 |
| JP | 2007-276671 A | 10/2007 |
| WO | WO 2009/011898 A2 | 1/2009 |
| WO | WO 2014/032971 A1 | 3/2014 |

OTHER PUBLICATIONS

German-language Written Opinion (PCT/ISA/237) issued in PCT Application No. PCT/EP2016/074705 dated Jan. 17, 2017 (six pages).
German-language Search Report issued in counterpart German Application No. 10 2015 221 180.0 dated Aug. 9, 2016 with partial English translation (13 pages).

* cited by examiner

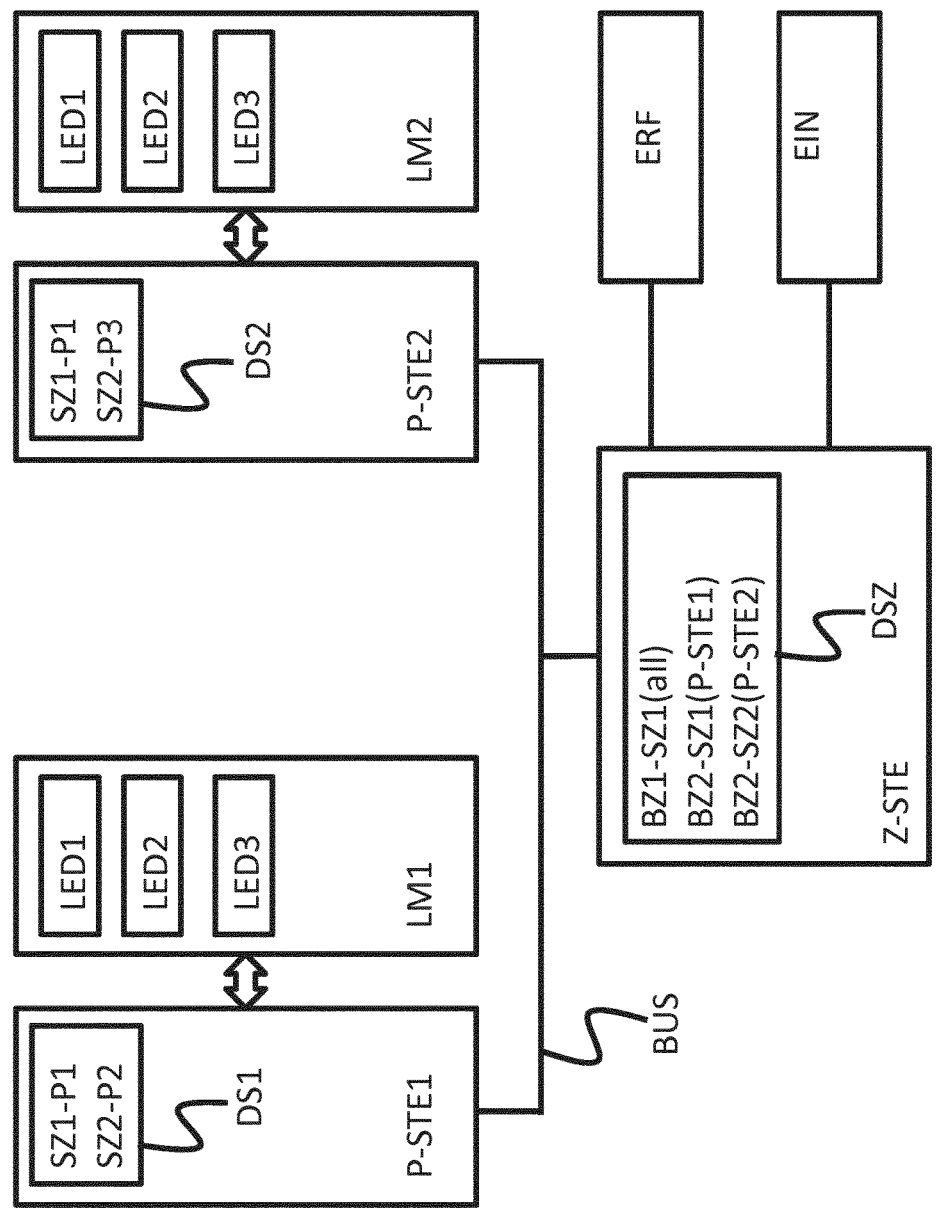

INTERIOR LIGHTING OF A MOTOR VEHICLE

CROSS REFERENCE TO RELATED APPLICATIONS

This application is a continuation of PCT International Application No. PCT/EP2016/074705, filed Oct. 14, 2016, which claims priority under 35 U.S.C. § 119 from German Patent Application No. 10 2015 221 180.0, filed Oct. 29, 2015, the entire disclosures of which are herein expressly incorporated by reference.

BACKGROUND AND SUMMARY OF THE INVENTION

The invention relates to a motor vehicle with a plurality of interior light modules.

The interiors of newer motor vehicles increasingly incorporate so-called ambient lighting functions which, depending on the type of vehicle or the target group, ensure a discrete or striking illumination of the interior. The use of this kind of lighting makes it easier for passengers to orient themselves within the vehicle, and creates an individual and comfortable atmosphere. The control and definition of the lighting functions is usually here implemented by a central control device.

The invention is based on the object of creating an improved motor vehicle.

This and other objects are achieved by a motor vehicle according to the invention comprising a central lighting control device and a plurality of peripheral lighting control devices distributed in the motor vehicle. A plurality of interior light modules are also provided, each of which comprises a plurality of light sources, and each of which is assigned to a peripheral lighting control device, in particular having a data coupling to it.

The central lighting control device and the peripheral lighting control devices are coupled together via a data bus. The peripheral lighting control devices each comprise a data memory in which the lighting effect parameter sets are stored, to each of which a lighting effect identifier is assigned.

The central lighting control device is designed to transmit lighting effect identifiers to peripheral lighting control devices in order to initiate motor vehicle interior lighting effects.

The distribution of the control function over a central lighting control device and a plurality of peripheral lighting control devices, and a non-central storage of lighting effect parameter sets in the peripheral lighting control devices, makes it possible for elaborate motor vehicle interior lighting effects to be implemented without overloading, or without excessive load on, the data bus technologies typically employed in motor vehicles, without having to omit the central controller. Instead of the transmission of a large number of comprehensive lighting effect parameter sets, it is only necessary for this purpose to transmit lighting effect identifiers from the central lighting control device to the peripheral lighting control devices.

It is particularly preferable to provide here that the distance between one or every peripheral lighting control device and the central lighting control device is three times as large, five times as large, ten times as large or twenty times as large as the distance between the peripheral lighting control device and the assigned interior light module.

A further advantage of the invention is that through the exchange of individual light modules, including the respectively associated peripheral lighting control device, the motor vehicle interior lighting effects can be easily changed, in that in the exchanged peripheral lighting control devices different lighting effect parameter sets are assigned to the respective lighting effect identifiers from those in the original peripheral lighting control devices.

Peripheral lighting control devices can be arranged, for example, at the insides of doors, at the motor vehicle roof liner, at the motor vehicle A-pillar, at the motor vehicle B-pillar, at the motor vehicle C-pillar, at the glove compartment, around operating elements, around a display and/or on an instrument panel, or can be an element of these components.

An interior light module comprises, for example, a plurality of LEDs, in particular of different colors, and/or a plurality of RGB-LEDs. Preferably each interior light module is data-coupled and possibly also energy-coupled to a peripheral lighting control device. It is particularly preferably provided that an interior light module comprises a plurality of light sources or light source groups arranged adjacent to one another which can be switched on or activated with a time delay between each other, and preferably can correspondingly be switched off or deactivated with a time delay between each other, so that the impression of a running light is created for an observer. Preferably for this purpose the light sources of an interior light module can be activated and/or deactivated sequentially and cyclically.

A lighting effect parameter set comprises, for example, control information for at least one interior light module, through which, for example, it is defined which light source or which light sources of the interior light module is or are activated, i.e. made to light up, when, until when, for how long, in what color, with what intensity and/or with what intensity curve.

The lighting effects are, preferably, dynamic lighting effects. A running light scene, for example, can thus be described or defined by a switch-on time and a switch-off time, a switch-on time and an associated light duration, or a delay time duration and a light duration for the individual, adjacent light sources or groups of light sources arranged in series.

In a peripheral lighting control device, a respective lighting effect identifier is preferably assigned to each lighting effect parameter set. As a result of the reception of a lighting effect identifier from the central lighting control device by a peripheral lighting control device, the lighting effect parameter set that is assigned to this lighting effect identifier is used by the peripheral lighting control device to activate the associated light module and the light sources contained within it in such a way that the desired motor vehicle interior lighting effect is generated.

Preferably, the central lighting control device is configured such that different lighting effect identifiers are transmitted to different peripheral lighting control devices to initiate a motor vehicle interior lighting effect. Alternatively or additionally, different lighting effect parameter sets are assigned in different peripheral lighting control devices to the same lighting effect identifiers. The central lighting control device can be configured such that the same lighting effect identifiers are transmitted to different peripheral lighting control devices to initiate a motor vehicle interior lighting effect.

In a further development of the invention, the central lighting control device is coupled to detection devices for detecting motor vehicle operating states. Different lighting effect identifiers or groups of lighting effect identifiers are assigned in the central lighting control device to different motor vehicle operating states. And, the central lighting control device is configured such that lighting effect identifiers or groups of lighting effect identifiers are transmitted to peripheral lighting control devices automatically, depending on a detected motor vehicle operating state. Information about assignments of lighting effect identifiers to motor vehicle operating states is stored for this purpose in the central lighting control device, for example in a data memory.

This allows elaborate lighting effects relating to the entire motor vehicle interior to be implemented in practice in a manner dependent on current motor vehicle operating states.

Measuring devices and/or sensors that are in any case present in a motor vehicle are, for example, provided as detection devices. The following states are provided, for example, as motor vehicle operating states: door(s) locked, door(s) unlocked, window open, window closed, trunk open, trunk closed, engine off, ignition on, engine on, selected drive level, selected driving dynamic program, radio on, radio off, incoming call, output of specific driving maneuver instruction, detection of particular speed values, detection of particular acceleration values, output of particular operating instructions, presence of particular temperature ranges, presence of particular light conditions, presence of particular hazardous situations and/or the output of particular hazard information.

It is an alternative or additional development that the central lighting control device is coupled to input devices for the input of user preferences. Different lighting effect identifiers or groups of lighting effect identifiers are assigned in the central lighting control device to different user preferences. And, the central lighting control device is configured such that lighting effect identifiers or groups of lighting effect identifiers are transmitted to peripheral lighting control devices automatically, depending on a user preference that has been entered. Information about assignments of lighting effect identifiers to user preferences is stored for this purpose in the central lighting control device, for example in a data memory.

This allows elaborate lighting effects relating to the entire motor vehicle interior to be implemented in practice in a manner dependent on current user preferences.

The input devices consist, for example, of buttons, a keypad, a touch display, a touchpad and/or a rotary knob, through which user preferences can be entered in a manner known per se. User wishes can, for example, be entered through the actuation of predetermined buttons, or through the selection of predetermined menu points. A menu point can, for example, be specified through the name of a particular color scene, a particular color effect, or a particular color mood.

The activation of the light sources of a light module is preferably defined through a lighting effect parameter set.

It is particularly preferably provided that at least one interior light module is optically coupled to a light guide or a diffuser disk, in particular for optically influencing the light generated by the interior light module.

Different lighting effect identifiers are preferably assigned to the same lighting effect parameter sets in the respective data memories in different peripheral lighting control devices. Alternatively or additionally, the same lighting effect identifiers are assigned to the same lighting effect parameter sets in the respective data memories in different peripheral lighting control devices.

The variety of possible interior lighting effects is increased in a simple manner through these developments.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a simplified, schematic block diagram of an interior lighting system of a motor vehicle according to an embodiment of the invention.

DETAILED DESCRIPTION OF THE DRAWING

The interior lighting of a motor vehicle from FIG. 1 discloses a central lighting control device Z-STE, whose hardware is known per se, and two peripheral lighting control devices, P-STE1, P-STE2, the hardware of which can again be constructed in a manner known per se, distributed in the motor vehicle.

Two interior light modules LM1, LM2 are also provided, each of which comprises a plurality of LED-based light sources LED1, LED2, LED3, each of which is assigned to a peripheral lighting control device P-STE1, P-STE2 and data-coupled to it. The LED-based light sources LED1, LED2, LED3 can comprise a plurality of individual, differently colored LEDs and/or a plurality of RGB-LEDs.

The interior light modules LM1, LM2 are, for example, installed in the inner cladding of the left-hand or right-hand side driver's door. The light from the light sources LED1, LED2, LED3 is coupled here into a light guide (not illustrated), passed through the light guide and coupled out again at desired areas. As an alternative to this, the light from the light sources LED1, LED2, LED3 passes through a diffuser disk or a component similar to a diffuser disk.

The central lighting control device Z-STE and the peripheral lighting control devices P-STE1, P-STE2 have a data connection via a motor vehicle data bus BUS, known per se, such as for example an LIN-bus.

The peripheral lighting control devices P-STE1, P-STE2 each comprise a data memory DS1, DS2, in which the lighting effect parameter sets P1, P2, P3 are stored, to each of which a lighting effect identifier SZ1, SZ2 is assigned. A typical lighting effect parameter set P1, P2, P3 contains, for example, information about light color, light duration, light intensity, delay time, activation time point, deactivation time point and/or light intensity curve, respectively, for the individual light sources LED1, LED2, LED3 of at least one interior light module LM1, LM2.

The central lighting control device Z-STE is now configured, in particular through programming, such that depending on a currently present motor vehicle operating state, in particular one that has been detected, and/or depending on a currently present user preference, in particular one that has been entered, lighting effect identifiers SZ1, SZ2 are transmitted to the peripheral lighting control devices P-STE1, P-STE2 over the motor vehicle data bus BUS, on the basis of transmission and addressing methods known per se.

After receipt of the lighting effect identifiers SZ1, SZ2 addressed respectively to P-STE1, P-STE2, these lighting effect identifiers SZ1, SZ2 are mapped by the peripheral lighting control devices P-STE1, P-STE2 respectively onto the associated lighting effect parameter sets P1, P2, P3. These associated parameter sets P1, P2, P3 are then used by the peripheral lighting control device P-STE1, P-STE2 to activate the respective light sources LED1, LED2, LED3 of the respective interior light modules LM1, LM2 such that the individual light sources LED1, LED2, LED3 are activated to generate light in accordance with the information described in the lighting effect parameter sets P1, P2, P3. The peripheral lighting control devices P-STE1, P-STE2 can, for this purpose for example, also comprise pulse-width modulation drivers, known per se.

For reasons of simplicity, the supply of energy to the individual components of the interior lighting, known per se, will not be considered in any more detail.

In the following, an assignment of motor vehicle operating states BZ1, BZ2 to lighting effect identifiers SZ1, SZ2, and of lighting effect identifiers SZ1, SZ2 to lighting effect parameter sets P1, P2, P3, and their application is explained on the basis of an example.

Different lighting effect identifiers SZ1, SZ2 are assigned to different motor vehicle operating states BZ1, BZ2 in a data memory DSZ of the central lighting control device Z-STE:
BZ1-SZ1,
BZ2-SZ1,
BZ2-SZ2.

These assignments apply here, for example, to all peripheral lighting control devices (BZ1-SZ1 (all)) or only to specific peripheral lighting control devices (BZ2-SZ1(P-STE1); BZ2-SZ2(P-STE2)).

If, for example, a motor vehicle operating state BZ1 is detected, then the lighting effect identifier SZ1 is transmitted to all the peripheral lighting control devices (all).

If, for example, on the other hand, a motor vehicle operating state BZ2 is detected, then the lighting effect identifier SZ1 is transmitted, in particular addressed, to a first peripheral lighting control device P-STE1, and the lighting effect identifier SZ2 is transmitted to a second peripheral lighting control device P-STE2.

The reception and the processing of a first lighting effect identifier SZ1 has the effect in the first peripheral lighting control device P-STE1 or in the second peripheral lighting control device P-STE2 of activating the light module LM1 or the light module LM2 according to the lighting effect parameter set P1 (SZ1-P1).

On the other hand, the reception and the processing of a second lighting effect identifier SZ2 has the effect in the first peripheral lighting control device P-STE1 of activating the first light module LM1 according to the lighting effect parameter set P2 (SZ2-P2), and in the second peripheral lighting control device P-STE2 of activating the second light module LM2 according to the lighting effect parameter set P3 (SZ2-P3).

In this way, elaborate static and/or dynamic lighting effects affecting the entire interior of the motor vehicle can be implemented with a simple, proven data bus, known per se.

A running light for a lighting scene affecting the whole of the interior of the motor vehicle will be described below by way of example. It is assumed here that a first interior light module is arranged in the cladding of the left-hand front door, and a first peripheral lighting control device is arranged hidden by the cladding.

A second interior light module is inserted visibly into the instrument panel, and a second peripheral lighting control device, hidden by the instrument panel, is housed there. A third interior light module is arranged visibly in the cladding of the right-hand front door, and a third peripheral lighting control device is arranged hidden by the cladding.

The interior light modules are each implemented as running light modules, wherein light sources arranged respectively adjacent to one another are activated and/or deactivated, preferably cyclically, in temporal sequence, so that the impression of a running light is given to an observer.

Now, triggered for example by an appropriate user preference or a motor vehicle operating state, an associated running light lighting effect identifier is transmitted to the three peripheral lighting control devices.

The lighting effect parameter set assigned to this running light lighting effect identifier has the effect in the first peripheral lighting control device of triggering a running light from left to right with a starting delay of 0 ms and a total light running time of 500 ms (the light sources of the first light module generate a running light for 500 ms, i.e. the light sources of the light module are activated, and possibly deactivated again, (preferably for only one cycle) for 500 ms cyclically, delayed in time, one after another according to their physical sequence).

The lighting effect parameter set assigned to the running light lighting effect identifier in the second peripheral lighting control device has the effect in the second peripheral lighting control device of triggering a running light from left to right with a starting delay of 500 ms and a total light running time of 800 ms (the light sources of the second light module generate a running light for 800 ms).

The lighting effect parameter set assigned to the running light lighting effect identifier in the third peripheral lighting control device has the effect in the third peripheral lighting control device of triggering a running light from left to right with a starting delay of 1300 ms and a total light running time of 500 ms (the light sources of the third light module generate a running light for 500 ms).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a central lighting control device;
   a plurality of peripheral lighting control devices distributed in the motor vehicle;
   a plurality of interior light modules, each of which comprises a plurality of light sources, and each of which is assigned to a respective one of the plurality of peripheral lighting control devices;
   a data bus, through which the central lighting control device and the plurality of peripheral lighting control devices are coupled to one another, wherein
   the plurality of peripheral lighting control devices each comprise a data memory, in which lighting effect parameter sets are stored, to each of which a lighting effect identifier is assigned, and
   the central lighting control device transmits lighting effect identifiers to at least one of the plurality of peripheral lighting control devices in order to initiate motor vehicle interior lighting effects.

2. The motor vehicle as claimed in claim 1, wherein
   in the central lighting control device, different lighting effect identifiers or groups of lighting effect identifiers are assigned to different motor vehicle operating states, and
   the central lighting control device is configured such that lighting effect identifiers or groups of lighting effect identifiers are transmitted to the at least one of the plurality of peripheral lighting control devices automatically, depending on a detected motor vehicle operating state.

3. The motor vehicle as claimed in claim 2, wherein
the central lighting control device is coupled to input devices for input of user preferences, wherein, in the central lighting control device, different lighting effect identifiers or groups of lighting effect identifiers are assigned to different user preferences, and
the central lighting control device is configured such that lighting effect identifiers or groups of lighting effect identifiers are transmitted to the at least one of the plurality of peripheral lighting control devices automatically, depending on a user preference that has been entered.

4. The motor vehicle as claimed in claim 1, wherein
the central lighting control device is coupled to input devices for input of user preferences, wherein, in the central lighting control device, different lighting effect identifiers or groups of lighting effect identifiers are assigned to different user preferences, and
the central lighting control device is configured such that lighting effect identifiers or groups of lighting effect identifiers are transmitted to the at least one of the plurality of peripheral lighting control devices automatically, depending on a user preference that has been entered.

5. The motor vehicle as claimed in claim 1, wherein
the activation of the light sources of a light module is defined through a lighting effect parameter set.

6. The motor vehicle as claimed in claim 1,
different lighting effect identifiers are assigned to the same lighting effect parameter sets in the respective data memories in different ones of the plurality of peripheral lighting control devices.

7. The motor vehicle as claimed in claim 1, wherein
the same lighting effect identifiers are assigned to the same lighting effect parameter sets in the respective data memories in different ones of the plurality of peripheral lighting control devices.

8. The motor vehicle as claimed in claim 1, wherein the parameter sets stored in the data memory of each of the plurality of peripheral lighting control devices comprises information about light color, light duration, light intensity, delay time, activation time point, deactivation time point and/or light intensity curve.

9. The motor vehicle as claimed in claim 8, wherein after receipt of the lighting effect identifiers transmitted by the central lighting control device, the at least one of the peripheral lighting control devices maps the received lighting effect identifiers onto an assigned lighting effect parameter set stored in the data memory of a respective one of the at least one of the peripheral lighting control devices.

10. The motor vehicle as claimed in claim 9, wherein the at least one of the peripheral lighting control devices activate at least one of the plurality of light sources of a respective one of the plurality of interior light modules to which the at least one of the peripheral lighting control devices are assigned based on the assigned lighting effect parameter set stored in the data memory at least one of the peripheral lighting control devices.

* * * * *